United States Patent
Song et al.

(10) Patent No.: US 11,849,744 B2
(45) Date of Patent: Dec. 26, 2023

(54) MANUFACTURING METHOD FOR POWDERED FERMENTED PASTE

(71) Applicant: CJ Cheiljedang Corporation, Seoul (KR)

(72) Inventors: Chi Kwang Song, Anyang-si (KR); Dong Min Moon, Seoul (KR); Hye Won Shin, Seoul (KR); Byoung Seok Moon, Anyang-si (KR); Dae Ik Kang, Goyang-si (KR)

(73) Assignee: CJ Cheiljedang Corporation, Seoul (KR)

( * ) Notice: Subject to any disclaimer, the term of this patent is extended or adjusted under 35 U.S.C. 154(b) by 86 days.

(21) Appl. No.: 17/162,742

(22) Filed: Jan. 29, 2021

(65) Prior Publication Data

US 2021/0145032 A1    May 20, 2021

Related U.S. Application Data

(63) Continuation of application No. 15/406,086, filed on Jan. 13, 2017, now abandoned.

(51) Int. Cl.
| | |
|---|---|
| *A23L 3/44* | (2006.01) |
| *A23L 25/00* | (2016.01) |
| *A23B 7/024* | (2006.01) |
| *A23L 19/00* | (2016.01) |
| *A23L 27/24* | (2016.01) |
| *A23L 11/50* | (2021.01) |
| *A23L 3/36* | (2006.01) |

(52) U.S. Cl.
CPC ............. *A23L 25/40* (2016.08); *A23B 7/024* (2013.01); *A23L 3/36* (2013.01); *A23L 3/44* (2013.01); *A23L 11/50* (2021.01); *A23L 19/01* (2016.08); *A23L 27/24* (2016.08); *A23V 2002/00* (2013.01)

(58) Field of Classification Search
CPC ... A23L 25/40; A23L 3/06; A23L 3/44; A23V 2002/00

USPC ....................................................... 426/384
See application file for complete search history.

(56) References Cited

U.S. PATENT DOCUMENTS

| | | |
|---|---|---|
| 4,680,190 A | 7/1987 | Spiel et al. |
| 5,741,138 A | 4/1998 | Rice et al. |
| 2004/0126478 A1* | 7/2004 | Kumagai ................ A23L 11/50 |
| | | 426/384 |
| 2010/0015283 A1 | 1/2010 | Jung et al. |
| 2010/0034757 A1* | 2/2010 | Fujii ..................... A61Q 19/00 |
| | | 435/267 |
| 2013/0326899 A1* | 12/2013 | Yagi ......................... F26B 3/30 |
| | | 34/266 |
| 2014/0120212 A1 | 5/2014 | Cadena-Garcia |
| 2016/0015055 A1 | 1/2016 | Kang et al. |
| 2018/0055076 A1 | 3/2018 | Song et al. |

FOREIGN PATENT DOCUMENTS

CN        1509640 A        7/2004

OTHER PUBLICATIONS

KR2002000457—Machine Translation. (Year: 2002).*
KR2002000457—English Abstract (Year: 2002).*
JP-2005-137233—English Abstract (Year: 2005).*
Schadle, E. R. et al. J. Food Sci. 48: 193-196 (Year: 1983).*
CN-1509640A—Machine Translation. (Year: 2004).*
Machine English language translation of DR 2002000457, Jan. 5, 2002.
Schadle, E.R. et al., J. Food Science 48:193-196; 1983.
CN 1509640A—Machine Translation, 2004.

* cited by examiner

*Primary Examiner* — Hamid R Badr
(74) *Attorney, Agent, or Firm* — Quarles & Brady LLP

(57) ABSTRACT

Methods for manufacturing a powdered fermented paste, including the steps of: pretreating a fermented paste; freezing the pretreated fermented paste; freeze-drying the frozen fermented paste; grinding the freeze-dried fermented paste; and heat-drying the ground fermented paste.

8 Claims, 6 Drawing Sheets

FIG. 6

| | Spray drying | Vacuum drying | Drum drying | Combination of two drying methods |
|---|---|---|---|---|
| Hot pepper paste | | | | |
| Soybean paste | | | | |

FIG. 7

| | Spray drying | Vacuum drying | Drum drying | Combination of two drying methods |
|---|---|---|---|---|
| Hot pepper paste | | | | |
| Soybean paste | | | | |

MANUFACTURING METHOD FOR POWDERED FERMENTED PASTE

CROSS RELATED APPLICATION

This application is a continuation of U.S. application Ser. No. 15/406,086 filed on Jan. 13, 2017, entitled "Manufacturing Method for Powdered Fermented Paste" and claims priority to Korean Patent Application Serial No. 10-2016-0111726, filed on Aug. 31, 2016, and Korean Patent Application Serial No. 10-2016-0133632, filed on Oct. 14, 2016, the contents of which are incorporated herein by reference.

BACKGROUND

1. Technical Field

The present disclosure relates to a method for manufacturing a powdered fermented paste.

2. Related Art

Since the health functionalities of Korean foods and the physiological functionalities of traditional fermented foods have been reported, the demand for traditional fermented paste products such as hot pepper paste ("Gochujang" in Korean), soybean paste ("Doenjang" in Korean) or seasoned soybean paste ("Ssamjang" in Korean) has increased worldwide. However, traditional fermented paste products contain various fermentation organism, including bacteria, yeast, lactic acid bacteria and fungi, and have various enzyme activities, including protease, amylase and lipase activities, and thus the taste quality thereof can be deteriorated during distribution. In addition, there was difficulty in the globalization of these pastes due to the characteristic odor of the paste and the inconvenience of use thereof. To overcome such problems, a synthetic preservative such as sorbic acid may be used, but it is contradictory to current wellbeing or health trends. In addition, transportation or sale of these fermented pastes in a refrigerated state leads to an increase in distribution costs and a decrease in price competitiveness.

Thus, for global distribution of traditional fermented products, there is a need for a method capable of dramatically increasing the shelf-life of these products and increasing the convenience of use of these products while maintaining the taste quality of these products. Thus, the demand for powdered fermented paste products is increasing.

Conventional drying methods for grinding fermented paste include hot-air drying, low-temperature dehumidification drying, vacuum drying, spray drying, freeze drying, drum drying, etc. However, when such drying methods are applied to fermented pastes, there are problems that the drying takes long time (24-72 hours) due to the influence of starch materials contained in the fermented pastes and that the taste quality of the pastes is reduced for the reason that a long time of high-temperature drying makes the fermented paste carbonized. In addition, there is a problem that caking of the fermented paste occurs during distribution.

SUMMARY

It is an object of the present disclosure to provide a method for manufacturing a powdered fermented paste.

To achieve the above object, in one aspect, the present disclosure provides a method for manufacturing a powdered fermented paste, comprising the steps of: (1) pretreating a fermented paste; (2) freezing the pretreated fermented paste; (3) freeze-drying the frozen fermented paste; (4) grinding the freeze-dried fermented paste; and (5) heat-drying the powdered fermented paste.

BRIEF DESCRIPTION OF THE DRAWINGS

FIG. 6 is photographs that compare the appearances of hot pepper paste and soybean paste powders prepared using different drying methods.

FIG. 7 is photographs that compare the solubility of hot pepper paste and soybean paste powders prepared using different drying methods.

DETAILED DESCRIPTION

Figure 1:
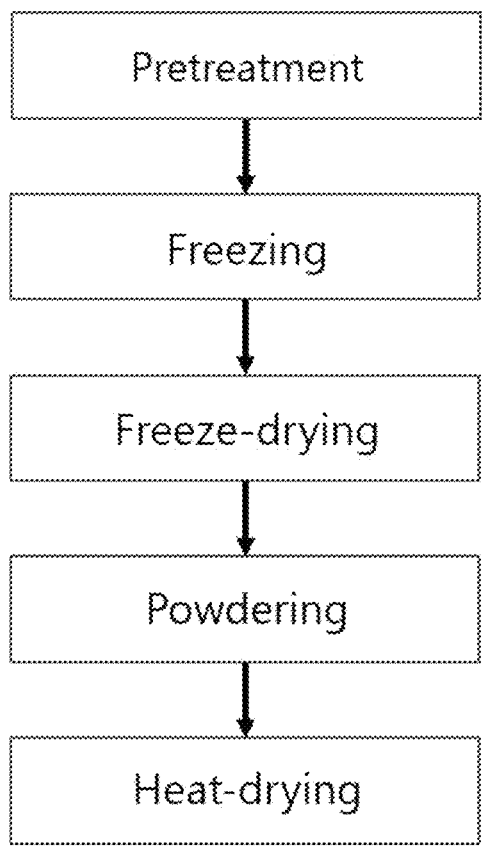
FIG. 1 is a flowchart showing a method for manufacturing a powdered fermented paste according to the present disclosure.
Figure 2:
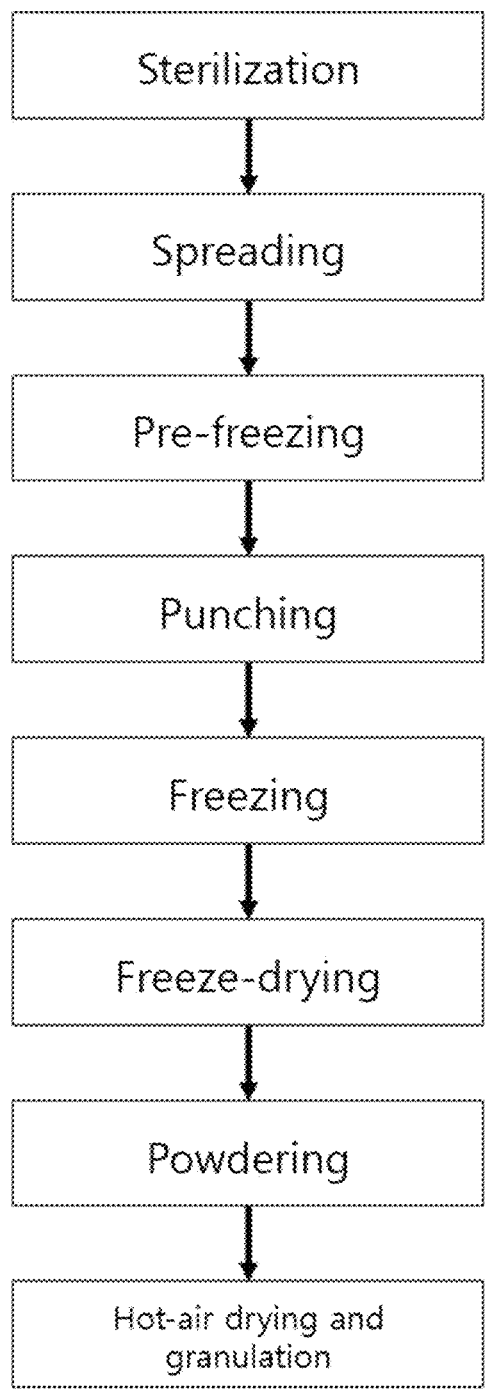
FIG. 2 is a flowchart specifically illustrating a method for manufacturing a powdered fermented paste according to the present disclosure.

Hereinafter, the present disclosure will be described in detail.

One aspect of the present disclosure is directed to a method for manufacturing a powdered fermented paste, comprising the steps of: (1) pretreating a fermented paste; (2) freezing the pretreated fermented paste; (3) freeze-drying the frozen fermented paste; (4) grinding the freeze-dried fermented paste; and (5) heat-drying the powdered fermented paste.

Step (1) of the method according to the present disclosure is a step of pretreating a sauce in order to manufacture a powdered fermented paste.

The sauce in step (1) may be a known traditional fermented food. Specifically, the fermented paste may be one selected from among hot pepper paste ("Gochujang" in Korean), soybean paste ("Doenjang" in Korean) or seasoned soybean paste ("Ssamjang" in Korean), but is not limited thereto. Specifically, hot pepper paste, soybean paste or seasoned soybean paste may have a water content of 40-65 wt %, more specifically 43-60 wt %.

Step (1) may comprise any step of treating the fermented paste in order to prepare a powdered fermented paste. Specifically, step (1) may comprise a step of sterilizing the fermented paste. Fermented paste products have a total bacterial count of about $10^7$-$10^9$ CFU/g, comprise various fermentation organism, including bacteria, yeasts, lactic acid bacteria and fungi, and have various enzyme activities, including protease, amylase and lipase activities. Thus the above reasons can make the taste quality thereof deteriorated during distribution. Thus, the step of sterilizing the fermented paste is performed in order to prevent this deterioration.

The sterilizing step may be performed using a known sterilization method. Specifically, the sterilizing step may be performed by a method utilizing one or more sterilizers selected from among a multi-tube sterilizer, a steam pot sterilizer, a high-temperature high-pressure sterilizer, a sterilization tank and a tubular sterilizer, but is not limited thereto. In a specific method for sterilizing the sauce, the fermented paste may be sterilized with the above-described sterilizer at a temperature of 60 to 100° C. for 20-60 minutes to kill fungi, yeast, *E. coli*, food poisoning bacteria, etc., or may be sterilized with a high-temperature high-pressure sterilizer or a tubular sterilizer at a temperature of 110 to 150° C. for 10 seconds to 30 minutes to kill thermal resistant bacteria.

In addition, step (1) may further comprise, after the sterilizing step, a step of spreading the pretreated fermented paste. The spreading step is a step in which the fermented paste is placed and spread thinly in a container in order to shorten the processing time of subsequent steps. The container in which the fermented paste is spread may be a known container. Specifically, the fermented paste may be spread in a tray or a mold consisting of a plurality of blocks. More specifically, the tray may have a size of 1500 mm×1200 mm×50 mm, and the block may have a size of 50 mm×50 mm×20 mm, but is not limited thereto.

In the present disclosure, step (2) is a step of freezing the pretreated fermented paste.

Step (2) is a step of freezing water contained in the fermented paste to form a solid, and may be performed using a known freezer. Specifically, step (2) may be performed by freezing the fermented paste in a freeze storage chamber. More specifically, step (2) may be performed in a freezing chamber at a temperature between −30° C. and −50° C. for 2-16 hours, specifically 3-15 hours, more specifically 5-13 hours, but is not limited thereto. The freezing step makes it possible to reduce the time required for freezing during freeze-drying, increase the stability of the sauce product by storing the fermented paste in a frozen state before product production, and quickly meet the demand for the fermented paste product.

Additionally, the method of the present disclosure may further comprise, before step (2), a step of punching the fermented paste. The punching step is a step of forming fine holes in the sauce, and may be performed using a known punching machine or a mold that can exhibit the same effect as punching, but is not limited thereto. When a pre-freezing step as described below is performed to impart a shape-retaining property to the fermented paste, the fermented paste may be easily punched in the punching step without an additional device even when a punching frame is removed.

The method of the present disclosure may further comprise, before the punching step, a step of pre-freezing the fermented paste. The pre-freezing step is a step of freezing a portion of water contained in the fermented paste to form a solid, and may serve to impart a shape-retaining property to the pretreated sauce which may have no shape-retaining property. As used herein, the term "shape-retaining property" means that holes formed by punching of the pre-frozen sauce are retained after punching. The pre-freezing step may be performed using a known freezer. Specifically, the pre-freezing may be performed in a freezing chamber at a temperature between −30° C. and −50° C. for 1-12 hours.

In the method according to the present disclosure, step (3) is a step of freeze-drying the frozen fermented paste. Step (3) is a step in which a portion of water in the fermented paste is removed by reducing the pressure at the freezing temperature or increasing the temperature at a constant pressure to sublimate the frozen ice. Step (3) may be performed using a known freeze-dryer. Specifically, the sauce may be freeze-dried at a vacuum level of 0.01-0.5 Torr and at a temperature between −20° C. and 80° C., and may be freeze-dried while the temperature is controlled in a stepwise manner. Specifically, the fermented paste may be freeze-dried while the temperature is controlled in 4-5 steps. When the freeze-drying is performed while the temperature is controlled in a stepwise manner, the efficiency of drying may be increased. The freeze-drying may be performed for 9-17 hours until the water content of the sauce reaches 10-20 wt %, so that the sauce can be ground in step (4) (grinding step) to be described below.

In the method according to the present disclosure, step (4) is a step of grinding the freeze-dried fermented paste.

Step (4) is a step of finely grinding the freeze-dried fermented paste, and may be performed using a known grinder. Specifically, the freeze-dried fermented paste may be ground using a cutting mill, a disc mill, a pin mill or a blade mill, but is not limited thereto. In the grinding step, the freeze-dried fermented paste may be ground to a size of 30-80 mesh. If the freeze-dried sauce is ground to have a size of less than 30 mesh, the time required for a granulating step to be described later will increase, resulting in a decrease in the economic efficiency of the overall process. If the freeze-dried fermented paste is ground to a size of more than 80 mesh, the economic efficiency of the process can be reduced due to an increase of the grinding time, and quality deterioration such as browning can be caused by heat generated during grinding, and caking can be caused by an increase of the contact area between particles and by oxidation.

In the method according to the present disclosure, step (5) of heat-drying the ground fermented paste is a step of removing water from the ground fermented paste by heat. Step (5) may be performed using a known dryer. Specifically, step (5) may be performed using a hot-air dryer or a fluidized-bed dryer, but is not limited thereto. The heat drying may be performed at a temperature of 40 to 100° C., specifically 50 to 90° C., for 30 minutes to 6 hours, specifically 1 to 5 hours, until the water content of the sauce reaches 8% or less.

Step (5) of heat-drying may comprise a step of granulating the ground fermented paste while drying the sauce. Specifically, the granulating step may be performed simultaneously with or after heat drying. When the ground fermented paste is dried using a binder in the granulating step, the contact area between the ground particles can decrease so that caking can be effectively prevented, and the fermented paste product can be stored for a certain period of time without caking even when the product package is opened.

The binder that is used in the granulating step may be one or more selected from among water, starch, soy sauce, fish sauce, sugar, alcohol, gum, oil, and vinegar, which have the effect of forming granules, but is not limited thereto. The oil may be known oil, specifically, soybean oil, olive oil or grape seed oil, but is not limited thereto.

The granulating step may be performed until the size of the powder reaches 10-60 mesh. If the ground fermented paste is granulated to a size of less than 10 mesh, the economic efficiency of the process will decrease, and if the ground fermented paste is granulated to a size of more than 60 mesh, caking and browning may occur due to water contained in the granulated powder.

Hereinafter, the present disclosure will be described in further detail with reference to examples. It is to be understood, however, that these examples are for illustrative purposes only and are not intended to limit the scope of the present disclosure.

EXAMPLES

Preparation Example 1: Preparation of Powdered Sauce (1) Step of Pretreating and Spreading Sauce Each of hot pepper paste, soybean paste and seasoned soybean paste was mixed in a steam pot sterilizer or a ribbon mixer to prepare sauce samples. Among these samples, a sample required to be sterilized against fungi, yeast, E. coli and food poisoning bacteria was sterilized in a mash kettle at 80° C. for 30 minutes, and a sample required to be sterilized against thermal resistant bacteria was sterilized in an autoclave at 120° C. for 30 seconds, thereby preparing hot pepper paste, soybean and seasoned soybean paste samples from which microorganisms were efficiently removed.

Each of the sterilized hot pepper paste, soybean paste and seasoned soybean paste samples was placed and spread thinly in a tray (1500 mm×1200 mm×50 mm) or in a plastic mold container consisting of a plurality of blocks (50 mm×50 mm×20 mm).

(2) Step of Pre-Freezing, Punching, and then Freezing

Each of the sauce samples was pre-frozen in a freezing chamber at −35° C. for 3 hour or in a freezing chamber at −40° C. for 2 hours and 30 minutes to thereby solidify the irregular fermented paste samples. Then, using a punching device having pins (2 mm thick and 20 mm long) arranged at intervals of 8 mm, or using a tray or a frame having pins (3 mm thick and 30 mm long) arranged at intervals of 10 mm, holes were formed in the solidified fermented paste samples. Then, the fermented paste samples having holes formed therein were frozen in a freeze storage chamber at −40° C. for 9 hours.

(3) Step of Freeze-Drying Frozen Fermented Paste Samples

The frozen fermented paste samples were placed in a freeze-dryer having a vacuum level of 0.3 Torr, and were freeze-dried at a shelf temperature between −20° C. and 80° C. while controlling the temperature in a stepwise manner. The freeze-drying was performed for 12 hours until the fermented paste samples reached a water content of 15 wt %, so that the sauce samples could be ground.

(4) Step of Grinding Fermented Pastes

The freeze-dried fermented paste samples were ground to a size of 30-80 mesh by means of a pin mill or a blade mill.

(5) Step of Heat-Drying and Granulating Fermented Pastes

The ground fermented paste samples were dried in a hot-air dryer at 75° C. for 2 hours while they were granulated to a size of 10-60 mesh by spraying with at least one binder selected from among water, starch, soy sauce, fish sauce, sugar, alcohol, gum, oil and vinegar, thereby manufacturing powdered sauces.

Experimental Example 1: Comparison of Drying Time of Sauces and Water Content, Lightness Value, Taste Quality and Solubility of Powdered Fermented Pastes Between Different Drying Methods In order to confirm the difference in properties of powdered fermented pastes by the drying method of the present disclosure, powders of each of hot pepper, soybean paste and seasoned soybean paste were prepared using the following three different methods which are based on the method of Preparation Example 1 and which use different drying techniques:

Method 1: sterilizing step→pre-freezing step→punching step→freezing step→freeze-drying step→grinding step→hot-air drying step.

Method 2: sterilizing step→pre-freezing step→punching step→freezing step→freeze-drying step→grinding step.

Method 3: sterilizing step→pre-freezing step→punching step→hot-air drying step→grinding step.

The drying step was performed until the water content of the sauce reached to 8% or less. The drying conditions used in each method are shown in Table 1 below, and the results of measurement of the total drying time and the water content, lightness value, taste quality and solubility of the prepared powdered fermented pastes are shown in Table 1.

TABLE 1

Drying condition and comparison results of the total drying time, the water content, lightness difference, taste quality and solubility of prepared powdered fermented pastes between preparation methods

| | | Comparison results | | | | | |
|---|---|---|---|---|---|---|---|
| | | Drying condition | | Total drying | Water | | | |
| Product | Method | Freeze-drying | Hot air drying | time (hr) | content (%) | Lightness value | Taste quality | Solubility |
| Hot pepper paste | 1 | O | O | 14* | 3.4 | 45.23 | 4.5 | 4.3 |
| | 2 | O | x | 30 | 3.2 | 45.35 | 4.6 | 4.5 |
| | 3 | x | O | 72 | 3.5 | 25.67 | 2.8 | 2.2 |
| Soybean paste | 1 | O | O | 14* | 3.2 | 65.43 | 4.2 | 4.4 |
| | 2 | O | x | 24 | 3.3 | 65.72 | 4.4 | 4.6 |
| | 3 | x | O | 65 | 3.1 | 35.48 | 2.5 | 2.1 |

TABLE 1-continued

Drying condition and comparison results of the total drying time, the water content, lightness difference, taste quality and solubility of prepared powdered fermented pastes between preparation methods

| | | Drying condition | | Comparison results | | | | |
|---|---|---|---|---|---|---|---|---|
| Product | Method | Freeze-drying | Hot air drying | Total drying time (hr) | Water content (%) | Lightness value | Taste quality | Solubility |
| Seasoned soybean paste | 1 | O | O | 14* | 3.4 | 54.41 | 4.1 | 4.2 |
| | 2 | O | x | 30 | 3.2 | 54.72 | 4.3 | 4.3 |
| | 3 | x | O | 72 | 3.3 | 34.26 | 2.4 | 2.1 |

*freeze-drying and hot air-drying times: 12 hr freeze-drying and 2 hr hot-air drying
freeze-drying: performed at a temperature between −20° C. and 80° C. while increasing the temperature in a stepwise manner
hot-air drying: performed at 75° C.
Lightness value: measured using Minolta CR-400 (Hunter Lab)
taste quality: sensory evaluation performed by 8 persons/5-point scale (5: very good, 4: good, 3: moderate, 2: poor, 1: very poor)
solubility: extent of dissolution measured after keeping in hot water (95° C.) for 1 minute/5-point scale (5: very soluble, 4: well soluble, 3: moderate, 2: poorly soluble, 1: not soluble)

Figure 3A:
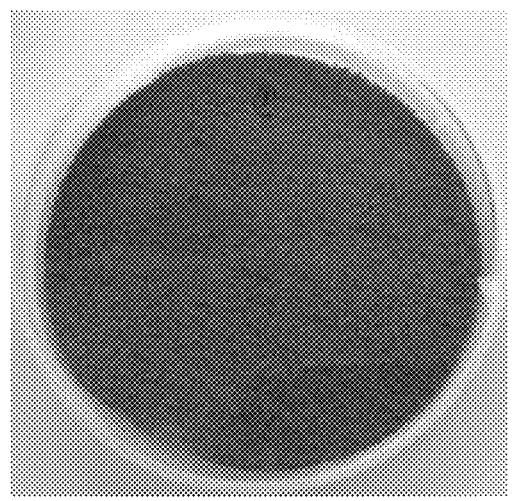
FIG. 3A is a photograph of hot pepper paste powder and FIG. 3B is a photograph of soybean paste powder, prepared by the steps of method 1 in Experimental Example 1 of the present disclosure.
Figure 3B:
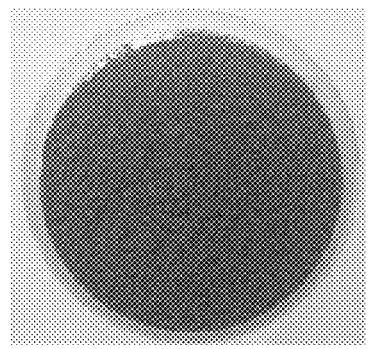
Figure 4A:
FIG. 4A is a photograph of hot pepper paste powder and FIG. 4B is a photograph of soybean paste powder, prepared by the steps of method 2 in Experimental Example 1 of the present disclosure.
Figure 4B:
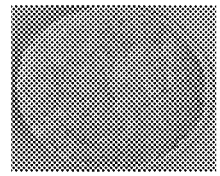

It could be seen that the powdered fermented paste prepared by method 1 (see FIG. 3A and FIG. 3B) was similar in terms of lightness value, taste quality and solubility to the powdered fermented paste prepared by method 2 (see FIGS. 4A and 4B), but the drying time in method 1 was about 14 hours shorter than that in method 2. In addition, it could be seen that method 1 showed shorter drying time (about 56 hours shorter) and better lightness value, taste quality and solubility than method 3.

Experimental Example 2: Comparison of the Water Content, Lightness Value and Solubility of Powdered Fermented Pastes after Freeze-Drying Between with and without Punching In order to confirm the difference in properties of powdered fermented pastes by the punching process of the present disclosure, powders of each of hot pepper paste, soybean paste and seasoned soybean paste were prepared according to the method of Preparation Example 1 under the pre-freezing and punching conditions shown in Table 2 below. The water content, lightness value and solubility of the prepared powdered fermented pastes were measured, and the results of the measurement are shown in Table 2 below.

TABLE 2

Water content, lightness value and solubility of powdered fermented pastes prepared under varying pre-freezing and punching conditions

| | Experimental conditions | | Carrying out (O) or not | Comparison results | | |
|---|---|---|---|---|---|---|
| Product | Pre-freezing temperature (° C.) | Pre-freezing time (hr) | carrying out (X) of punching | Water content (%) after freeze-drying | Lightness value | Solubility |
| Hot pepper paste | −35 | 3 | O | 13% | 45.23 | 4.5 |
| | | | X | 23% | 32.45 | 2.3 |
| | −40 | 2.5 | O | 12% | 47.78 | 4.4 |
| | | | X | 24% | 33.64 | 2.1 |
| Soybean paste | −35 | 3 | O | 11% | 65.43 | 4.5 |
| | | | X | 22% | 53.54 | 3.5 |
| | −40 | 2.5 | O | 12% | 64.81 | 4.5 |
| | | | X | 21% | 53.42 | 3.4 |
| Seasoned soybean paste | −35 | 3 | O | 13% | 54.68 | 4.3 |
| | | | X | 24% | 43.49 | 2.2 |
| | −40 | 2.5 | O | 14% | 55.86 | 4.4 |
| | | | X | 25% | 44.97 | 2.1 |

Lightness value: measured using Minolta CR-400 (Hunter Lab)
Solubility: extent of dissolution measured after keeping in hot water (95° C.) for 1 minute/5-point scale (5: very soluble, 4: well soluble, 3: moderate, 2: poorly soluble, 1: not soluble)

Figure 5A:
FIG. 5A is a photograph of hot pepper paste powder and FIG. 5B is a photograph of soybean paste powder, prepared without punching in Experimental Example 2 of the present disclosure.
Figure 5B:
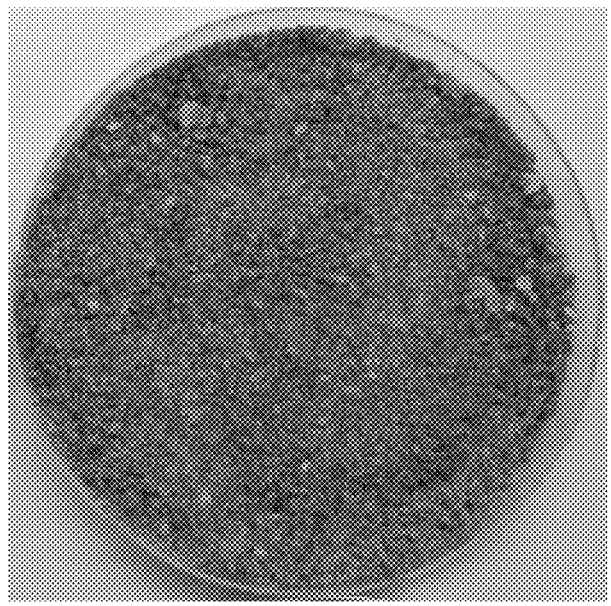

The non-punched sauce was not sufficiently dried, and for this reason, as shown in FIG. 5A and FIG. 5B, large particles were formed from the non-punched sauce during grinding. The powdered fermented paste obtained through freeze-drying after punching had a lower water content and better lightness and solubility than the powdered fermented paste obtained through freeze-drying without punching.

Experimental Example 3: Examination of Water Content of Powdered Fermented Pastes after Heat Drying and Granulating Step In order to examine the final water content of powdered fermented pastes prepared using a heat drying and granulating step, powders of each of hot pepper paste, soybean paste and seasoned soybean paste were prepared in the same manner as described in Preparation Example 1, in which the powders were prepared to have a particle size of 10-60 mesh by performing hot-air drying and binder spray under the conditions shown in Tables 3 to 5 below. Herein, the binder used was water, starch, soy sauce, fish sauce, sugar, alcohol, gum, oil or vinegar, which has the effect of binding granules and imparts a umami taste and savor.

The final water contents of the prepared powdered fermented pastes are shown in Tables 3 to 5.

TABLE 3

Hot-air drying and granulation conditions of hot pepper paste and the final water content of powdered fermented paste prepared from hot pepper paste

| Product | Hot-air drying temperature (° C.) | Drying time (hr) | Binder | Amount of spray (%) | Particle size (mesh) | Water content (%) after drying |
|---|---|---|---|---|---|---|
| Hot pepper paste | 55 | 5 | Water | 5 | 30-60 | 5.2 |
| | | | Alcohol | 5 | 30-60 | 5.7 |
| | | | Fish sauce | 13 | 10-30 | 7.5 |
| | | | Soy sauce | 13 | 10-30 | 7.3 |
| | | | Vinegar | 15 | 10-30 | 5.4 |
| | | | Starch | 8 | 10-30 | 5.8 |
| | | | Gum | 8 | 10-30 | 5.1 |
| | 65 | 4 | Water | 5 | 30-60 | 5.1 |
| | | | Alcohol | 5 | 30-60 | 5.5 |
| | | | Fish sauce | 13 | 10-30 | 7.3 |
| | | | Soy sauce | 13 | 10-30 | 7.1 |
| | | | Vinegar | 15 | 10-30 | 5.2 |
| | | | Starch | 8 | 10-30 | 5.5 |
| | | | Gum | 8 | 10-30 | 4.8 |
| | 75 | 3 | Water | 5 | 30-60 | 4.7 |
| | | | Alcohol | 5 | 30-60 | 4.5 |
| | | | Fish sauce | 13 | 10-30 | 6.5 |
| | | | Soy sauce | 13 | 10-30 | 6.3 |
| | | | Vinegar | 15 | 10-30 | 4.8 |
| | | | Starch | 8 | 10-30 | 4.9 |
| | | | Gum | 8 | 10-30 | 4.6 |
| | 85 | 2 | Water | 5 | 30-60 | 4.3 |
| | | | Alcohol | 5 | 30-60 | 3.8 |
| | | | Fish sauce | 13 | 10-30 | 5.4 |
| | | | Soy sauce | 13 | 10-30 | 4.8 |
| | | | Vinegar | 15 | 10-30 | 4.1 |
| | | | Starch | 8 | 10-30 | 3.8 |
| | | | Gum | 8 | 10-30 | 3.7 |

TABLE 4

Hot-air drying and granulation conditions of soybean paste and the final water content of powdered fermented paste prepared from soybean paste

| Product | Hot-air drying temperature (° C.) | Drying time (hr) | Binder | Amount of spray (%) | Particle size (mesh) | Water content (%) after drying |
|---|---|---|---|---|---|---|
| Soybean paste | 55 | 5 | Water | 5 | 30-60 | 5.3 |
| | | | Alcohol | 5 | 30-60 | 5.6 |
| | | | Fish sauce | 13 | 10-30 | 7.3 |
| | | | Soy sauce | 13 | 10-30 | 7.4 |
| | | | Vinegar | 15 | 10-30 | 5.2 |
| | | | Starch | 8 | 10-30 | 5.6 |
| | | | Gum | 8 | 10-30 | 4.9 |
| | 65 | 4 | Water | 5 | 30-60 | 4.8 |
| | | | Alcohol | 5 | 30-60 | 5.4 |
| | | | Fish sauce | 13 | 10-30 | 6.8 |
| | | | Soy sauce | 13 | 10-30 | 6.7 |

TABLE 4-continued

Hot-air drying and granulation conditions of soybean paste and the final water content of powdered fermented paste prepared from soybean paste

| Product | Hot-air drying temperature (° C.) | Drying time (hr) | Binder | Amount of spray (%) | Particle size (mesh) | Water content (%) after drying |
|---|---|---|---|---|---|---|
| | | | Vinegar | 15 | 10-30 | 5.1 |
| | | | Starch | 8 | 10-30 | 4.9 |
| | | | Gum | 8 | 10-30 | 4.7 |
| | 75 | 3 | Water | 5 | 30-60 | 4.7 |
| | | | Alcohol | 5 | 30-60 | 4.5 |
| | | | Fish sauce | 13 | 10-30 | 6.5 |
| | | | Soy sauce | 13 | 10-30 | 6.3 |
| | | | Vinegar | 15 | 10-30 | 4.8 |
| | | | Starch | 8 | 10-30 | 4.9 |
| | | | Gum | 8 | 10-30 | 4.6 |
| | 85 | 2 | Water | 5 | 30-60 | 4.1 |
| | | | Alcohol | 5 | 30-60 | 3.5 |
| | | | Fish sauce | 13 | 10-30 | 5.1 |
| | | | Soy sauce | 13 | 10-30 | 4.2 |
| | | | Vinegar | 15 | 10-30 | 4.1 |
| | | | Starch | 8 | 10-30 | 3.5 |
| | | | Gum | 8 | 10-30 | 3.3 |

TABLE 5

Hot-air drying and granulation conditions of seasoned soybean paste and the final water content of powdered fermented paste prepared from seasoned soybean paste

| Product | Hot-air drying temperature (° C.) | Drying time (hr) | Binder | Amount of spray (%) | Particle size (mesh) | Water content (%) after drying |
|---|---|---|---|---|---|---|
| Seasoned soybean paste | 55 | 5 | Water | 5 | 30-60 | 5.1 |
| | | | Alcohol | 5 | 30-60 | 5.5 |
| | | | Fish sauce | 13 | 10-30 | 7.3 |
| | | | Soy sauce | 13 | 10-30 | 7.1 |
| | | | Vinegar | 15 | 10-30 | 5.3 |
| | | | Starch | 8 | 10-30 | 5.5 |
| | | | Gum | 8 | 10-30 | 5.0 |
| | 65 | 4 | Water | 5 | 30-60 | 4.7 |
| | | | Alcohol | 5 | 30-60 | 5.3 |
| | | | Fish sauce | 13 | 10-30 | 7.2 |
| | | | Soy sauce | 13 | 10-30 | 6.9 |
| | | | Vinegar | 15 | 10-30 | 4.9 |
| | | | Starch | 8 | 10-30 | 5.3 |
| | | | Gum | 8 | 10-30 | 4.5 |
| | 75 | 3 | Water | 5 | 30-60 | 4.3 |
| | | | Alcohol | 5 | 30-60 | 4.2 |
| | | | Fish sauce | 13 | 10-30 | 6.6 |
| | | | Soy sauce | 13 | 10-30 | 6.4 |
| | | | Vinegar | 15 | 10-30 | 4.5 |
| | | | Starch | 8 | 10-30 | 4.9 |
| | | | Gum | 8 | 10-30 | 4.4 |
| | 85 | 2 | Water | 5 | 30-60 | 4.2 |
| | | | Alcohol | 5 | 30-60 | 3.7 |
| | | | Fish sauce | 13 | 10-30 | 4.9 |
| | | | Soy sauce | 13 | 10-30 | 4.5 |
| | | | Vinegar | 15 | 10-30 | 3.9 |
| | | | Starch | 8 | 10-30 | 3.6 |
| | | | Gum | 8 | 10-30 | 3.4 |

As shown in Tables 3 to 5 above, it could be seen that the powdered fermented pastes prepared using the heat drying and granulating step showed a low final water content of 3-8% due to a decrease in the area of contact between the powders, and thus was not substantially caked.

Example 4: Comparison of Taste Quality Preference, Color Preference and Solubility of Hot Pepper Paste and Soybean Paste Powders Between Different Drying Methods A comparison was made of the taste quality preference, color preference and solubility of hot pepper paste and soybean paste powders prepared using a combination of freeze-drying and heat-drying (a combination of two drying methods), and hot pepper paste and soybean paste powders prepared using conventional drying methods. The conventional drying methods used include spray drying, vacuum drying and drum drying methods.

In the spray drying method, a known spray dryer was used, and the inlet and outlet temperatures of the spray dryer were set at 190° C. and 90° C., respectively, thereby preparing hot pepper paste and soybean paste samples. When the spray drying method is applied, a dried material is attached to the wall surface of the spray dryer to reduce the recovery rate of the dried material, indicating that drying is difficult. For this reason, dextrin was added to hot pepper paste or soybean paste in an amount of 10-15 wt % in the preparation of samples.

In the vacuum drying method, a known vacuum dryer was used, and hot pepper paste and soybean paste samples were dried at a pressure of 150 Torr and a temperature between 80° C. and 110° C. for 24 hours. When vacuum drying is used, saccharide components on the surface of a dried material are concentrated and become hard by the migration of water from the inside of the dried material to the surface to thereby reduce the solubility of the dried material. For this reason, dextrin was added to the samples in an amount of 10-15 wt % in order to increase the efficiency of drying.

In the drum drying method, a device was used which performs drying by forming a thin film on the surface of a rotating drum and supplying heated steam into the drum. When the drum rotated about ¾, the dried thin film on the drum was rubbed with a scraper. To increase the efficiency of drying, 10-15 wt % of dextrin as a vehicle was added to the dried material.

In the combination of two drying methods, hot pepper paste and soybean paste samples were dried in the same manner as described in Preparation Example 1, thereby preparing powders.

The results that compare the taste quality preference, color preference and solubility of hot pepper paste and soybean paste powders between the different drying methods are shown in Tables 6 and 7, and the differences in appearance and solubility between the powders are shown in FIGS. 6 and 7.

TABLE 6

Comparison of taste quality preference, solubility and color preference between powdered hot pepper pastes prepared by different drying methods

| | | Spray drying | Vacuum drying | Drum drying | Combination of two drying methods |
|---|---|---|---|---|---|
| Taste quality preference | | 2.2 | 2.0 | 3.3 | 4.6 |
| Color preference | | 2.3 | 3.5 | 4.7 | 4.7 |
| Solubility | Cold water (8° C.) | 3.5 | 2.3 | 1.5 | 4.3 |
| | Hot water (95° C.) | 3.8 | 2 | 1.9 | 4.5 |

Level of taste quality preference and color preference: sensory evaluation performed by 30 people/5-point scale (5: very good, 4: good, 3: moderate, 2: poor, 1: very poor)
Solubility: degree of dissolution measured after keeping in each of cold water (8° C.) and hot water (95° C.) for 1 minute/5-point scale (5: very well soluble, 4: well soluble, 3: moderate, 2: poorly soluble, 1: not soluble)

TABLE 7

Comparison of taste quality preference, solubility and color preference between powdered soybean pastes prepared by different drying methods

| | | Spray drying | Vacuum drying | Drum drying | Combination of two drying methods |
|---|---|---|---|---|---|
| Taste quality preference | | 2.7 | 2.3 | 3.5 | 4.8 |
| Color preference | | 3.5 | 2.6 | 4.6 | 4.7 |
| Solubility | Cold water (8° C.) | 4.2 | 3.2 | 2.5 | 4.3 |
| | Hot water (95° C.) | 4.3 | 3.3 | 2.6 | 4.6 |

Level of taste quality preference and color preference: sensory evaluation performed by 30 people/5-point scale (5: very good, 4: good, 3: moderate, 2: poor, 1: very poor)
Solubility: degree of dissolution measured after keeping in each of cold water (8° C.) and hot water (95° C.) for 1 minute/5-point scale (5: very well soluble, 4: well soluble, 3: moderate, 2: poorly soluble, 1: not soluble)

As can be seen in Tables 6 and 7, the powdered fermented paste prepared by the spray drying method showed a low level of taste quality preference due to a burnt taste and a low color preference due to a dark color. The powdered fermented paste prepared by the vacuum drying method also showed a low level of taste quality preference due to a weak taste and a low color preference due to a dark color. The powdered fermented paste prepared by the drum drying method had savor, but showed a low level of taste quality preference due to a weak umami taste, compared to the powdered fermented paste prepared by the combination of two drying methods.

The powdered fermented paste prepared using the combination of freeze-drying and heat-drying according to the present disclosure had savor and umami taste, and thus showed a high taste quality preference. In addition, because it was prepared by drying at a temperature lower than those in the other drying methods, it showed less thermal denaturation and browning, and thus showed a high color preference. Furthermore, as shown in FIGS. 6 and 7, the powdered fermented paste prepared by the combination of two drying methods showed higher solubility than those of the powders prepared by the other drying methods, and thus had better overall quality.

As described above, according to the present disclosure, a high-quality powdered fermented paste product can be manufactured efficiently within a short time by increasing the efficiency of drying through the use of a combination of freeze-drying and heat-drying without having to add an additive during mixing. In other words, according to the present disclosure, in a state in which the efficiency of drying is rapidly reduced after a certain time of freezing drying, the dried sauce is ground, and then subjected to hot-air drying or fluidized-bed drying to remove even water adsorbed onto single-molecular layers, whereby the water content of the powdered fermented paste can be effectively reduced. Because the final water content of the powdered fermented paste according to the present disclosure is as low as about 3-8%, it is possible to prevent the taste and odor of the powdered fermented paste from being changed by caking and oxidation of the sauce particles during distribution. In addition, the powdered fermented paste product prepared using the drying method according to the present disclosure is prevented from caking during distribution or over a certain period of time even after opening of the product package.

Therefore, according to the present disclosure, a high-quality powdered fermented paste showing high stability during distribution can be economically produced.

What is claimed is:

1. A method for manufacturing a powdered fermented paste, comprising the steps of:
    (1) pretreating a fermented paste, wherein the water content of the fermented paste is 40 to 65 wt. %;
    (2) freezing the pretreated fermented paste;
    (3) freeze-drying the frozen fermented paste, wherein the water content of the freeze-dried fermented paste is 10 to 20 wt. %;
    (4) grinding the freeze-dried fermented paste; and
    (5) heat-drying the ground paste at a temperature of 75° C. to 100° C., for 30 minutes to 6 hours, wherein the water content of the heat dried ground paste is 8 wt. % or less,
    wherein the fermented paste comprises hot pepper paste, soybean paste or seasoned soybean paste, and
    wherein step (5) comprises a step of drying and granulating the ground fermented paste, and
    wherein the step of granulating the ground fermented paste comprises granulating the ground fermented paste to a size of 10-60 mesh.

2. The method according to claim 1, wherein step (1) comprises a step of sterilizing the fermented paste.

3. The method according to claim 1, further comprising, after step (1), a step of spreading the pretreated fermented paste.

4. The method according to claim 1, further comprising, before freezing step (2), a step of punching holes in the fermented paste.

5. The method of claim 4, further comprising, before the punching step, a step of pre-freezing the fermented paste.

6. The method of claim 1, wherein step (4) is a step of grinding the freeze-dried fermented paste to a size of 30-80 mesh.

7. The method of claim 1, wherein step (5) comprises hot-air drying or fluidized-bed drying.

8. The method of claim 1, wherein the step of granulating the ground fermented paste is performed by using at least one binder selected from the group consisting of water, starch, soy sauce, fish sauce, sugar, alcohol, gum, oil, vinegar, and mixtures thereof.

* * * * *